(12) United States Patent
Dong (10) Patent No.: US 12,432,741 B2
(45) Date of Patent: Sep. 30, 2025

(54) RESOURCE ALLOCATION METHOD, RESOURCE ALLOCATION APPARATUS AND STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 543 days.

(21) Appl. No.: 17/782,984

(22) PCT Filed: Dec. 9, 2019

(86) PCT No.: PCT/CN2019/124124
§ 371 (c)(1),
(2) Date: Jun. 6, 2022

(87) PCT Pub. No.: WO2021/114052
PCT Pub. Date: Jun. 17, 2021

(65) Prior Publication Data
US 2023/0007633 A1 Jan. 5, 2023

(51) Int. Cl.
*H04W 72/23* (2023.01)
(52) U.S. Cl.
CPC .................. *H04W 72/23* (2023.01)
(58) Field of Classification Search
CPC .... H04B 7/06; H04W 72/23; H04W 72/0453; H04W 72/042
See application file for complete search history.

(56) References Cited

U.S. PATENT DOCUMENTS

2017/0012756 A1* 1/2017 Li .................. H04L 1/1614
2017/0064718 A1* 3/2017 Bharadwaj .......... H04B 7/0452
2017/0111924 A1 4/2017 Josiam et al.
(Continued)

FOREIGN PATENT DOCUMENTS

CN 104039013 A 9/2014
CN 107409403 A 11/2017
(Continued)

OTHER PUBLICATIONS

ISA State Intellectual Property Office of the People's Republic of China, International Search Report Issued in Application No. PCT/CN2019/124124, Aug. 28, 2020 with English translation, (4p).
(Continued)

*Primary Examiner* — Andrew Lee
(74) *Attorney, Agent, or Firm* — Arch & Lake LLP (57) ABSTRACT

A resource allocation method, in which a probe trigger message frame is generated, where the probe trigger message frame includes index pairs for a plurality of Resource Units (RUs), each of the index pairs includes a start index and an end index, and the plurality of RUs are to be assigned to one or more stations (STAs) with a specified bandwidth; and the probe trigger message frame is transmitted. A second device receives a probe trigger message frame, where the probe trigger message frame includes index pairs for a plurality of RUs, and the plurality of RUs are to be assigned to one or more STAs with a specified bandwidth; and transmits a measurement message frame without a data portion based on the probe trigger message frame.

18 Claims, 4 Drawing Sheets

(56) References Cited

U.S. PATENT DOCUMENTS

| | | | | |
|---|---|---|---|---|
| 2017/0273083 A1* | 9/2017 | Chen | .................. | H04L 5/001 |
| 2017/0310424 A1* | 10/2017 | Chun | .................. | H04L 1/0075 |
| 2018/0205442 A1 | 7/2018 | Oteri et al. | | |
| 2019/0082373 A1* | 3/2019 | Patil | .................. | H04L 1/1614 |
| 2019/0215037 A1 | 7/2019 | Seok et al. | | |
| 2019/0251848 A1* | 8/2019 | Sivanesan | .................. | H04W 4/08 |
| 2019/0261369 A1 | 8/2019 | Verma et al. | | |
| 2019/0349067 A1 | 11/2019 | Huang et al. | | |
| 2020/0086098 A1* | 3/2020 | Uetsuki | .................. | A61M 35/003 |
| 2020/0145409 A1* | 5/2020 | Pochuev | .................. | H04L 63/0853 |
| 2020/0403680 A1* | 12/2020 | Li | .................. | H04B 7/0695 |
| 2021/0127282 A1* | 4/2021 | Um | .................. | H04L 27/261 |
| 2021/0250119 A1* | 8/2021 | Noh | .................. | H04L 1/0033 |
| 2021/0329698 A1* | 10/2021 | Jang | .................. | H04W 80/02 |
| 2022/0086098 A1* | 3/2022 | Huang | .................. | H04L 45/245 |

FOREIGN PATENT DOCUMENTS

| | | |
|---|---|---|
| CN | 108141261 A | 6/2018 |
| CN | 109412711 A | 3/2019 |
| CN | 113261211 A | 8/2021 |
| WO | 2018222177 A1 | 12/2018 |

OTHER PUBLICATIONS

Huang, Lei et al., "Signaling Support for Multi-RU Assignment," Doc.: IEEE 802.11-19/1868r0, Nov. 10, 2019, (13p).

First Office Action of Chinese Application No. 202211726626.1 dated Jun. 5, 2025, (12p).

* cited by examiner

| RU start index | RU end index | ... | ... | RU start index | RU end index |
|---|---|---|---|---|---|

RESOURCE ALLOCATION METHOD, RESOURCE ALLOCATION APPARATUS AND STORAGE MEDIUM

CROSS REFERENCE TO RELATED APPLICATIONS

The present application is the U.S. national phase of PCT Application No. PCT/CN2019/124124 filed on Dec. 9, 2019, the content of which is incorporated herein by reference in its entirety for all purposes.

BACKGROUND

Study group (SG) IEEE802.11be is established based on IEEE802.11 to study the next generation mainstream (802.11a/b/g/n/ac/ax) Wi-Fi technologies.

For the next generation mainstream (IEEE802.11ac/ax) Wi-Fi technologies, a beamforming mechanism is used to perform transmission measurements. In general, a probe trigger message frame such as a Null Data Packet (NDP) announcement frame is transmitted at the beginning of the measurement, and then a NDP frame is transmitted for measurement after a certain interval.

In the related art of the beamforming mechanism, the NDP announcement frame is for a single connection and only for assigning a resource unit (RU).

SUMMARY

Examples of the present disclosure provide a resource allocation method, a resource allocation apparatus and a storage medium.

According to a first aspect of examples of the present disclosure, there is provided a resource allocation method, being applicable to a first device. The method includes:
  generating a probe trigger message frame, where the probe trigger message frame includes index pairs of a plurality of Resource Units (RUs), each of the index pairs includes a start index and an end index, and two or more RUs in the plurality of RUs are to be assigned to one or more stations (STAs) with a specified bandwidth; and transmitting the probe trigger message frame.

According to a second aspect of examples of the present disclosure, there is provided a resource allocation method, being applicable to a second device. The method includes:
  receiving a probe trigger message frame, where the probe trigger message frame includes index pairs for a plurality of Resource Units (RUs), each of the index pairs includes a start index and an end index, and two or more RUs in the plurality of RUs are to be assigned to one or more stations (STAs) with a specified bandwidth; and transmitting a measurement message frame without a data portion based on the probe trigger message frame.

According to a third aspect of examples of the present disclosure, there is provided a resource allocation apparatus including:
  a processor; a memory for storing instructions executable by the processor;
  where the processor is configured to perform the first aspect or the resource allocation method of any one of the above examples in the first aspect.

According to a fourth aspect of examples of the present disclosure, there is provided a resource allocation apparatus including:
  a processor; a memory for storing instructions executable by the processor;
  where the processor is configured to perform the second aspect or the resource allocation method of any one of the above examples in the second aspect.

According to a fifth aspect of examples of the present disclosure, there is provided a non-transitory computer-readable storage medium, in response to instructions in the storage medium being executed by a processor, the processor is caused to perform the first aspect or the resource allocation method of any one of the above examples in the first aspect.

According to a sixth aspect of examples of the present disclosure, there is provided a non-transitory computer-readable storage medium, in response to instructions in the storage medium being executed by a processor, the processor is caused to perform the second aspect or the resource allocation method of any one of the above examples in the second aspect.

It should be understood that the above general description and the following detailed description are just exemplary and explanatory, and cannot construed as a limit to the present disclosure.

BRIEF DESCRIPTION OF THE DRAWINGS

The drawings herein are incorporated into the specification and constitute a part of the specification, illustrate examples according to the present disclosure, and are used to explain the principle of the present disclosure along with the specification.

DETAILED DESCRIPTION

The present disclosure relates to the field of communication, and in particular relates to a resource allocation method, a resource allocation apparatus and a storage medium.

Exemplary examples will be described in detail here, and examples thereof are illustrated in the accompanying drawings. When the following description relates to the drawings, unless otherwise indicated, the same reference signs in different drawings indicate the same or similar elements.

The implementation manners described in the following exemplary examples do not represent all implementation manners consistent with the present disclosure. Rather, they are merely examples of devices and methods consistent with some aspects of the present disclosure as set forth in the appended claims.

A resource allocation method provided by examples of the present disclosure can be applied to a Wireless Local Area Network (WLAN) communication system that includes a data transmitting device and a data receiving device. The data transmitting device and the data receiving device may be a station (STA) or an Access Point (AP). The data transmitting device and the data receiving device perform forward and backward transmission of data via the WLAN.

The STA involved in the present disclosure can be understood to be a user terminal in the WLAN, which can be referred to as a User Equipment (UE), a Mobile Station (MS), a Mobile Terminal (MT), etc., and is a device that provides voice and/or data connectivity to a user. For example, a terminal can be a handheld device, a vehicle-mounted device and other devices with wireless connectivity. At present, some examples of the terminal include: a Mobile Phone, a Pocket Personal Computer (PPC), a palm-top computer, a Personal Digital Assistant (PDA), a laptop, a tablet, a wearable device, a client of Internet of Things (IoT) or an in-car device, etc.

The AP involved in the present disclosure refers to a device, a router, etc. for a user terminal in the WLAN to access the network.

In the related art, data frames are transmitted between STA and AP based on IEEE802.11 standard. At present, study group (SG) IEEE802.11be is established based on IEEE802.11 to study the next generation mainstream (802.11a/b/g/n/ac/ax) Wi-Fi technologies, and the scope of the study includes: transmission with a bandwidth of 320 MHz, aggregation and cooperation of a plurality of frequency segments, etc. The proposed vision is to, compared to the existing IEEE802.11ax, increase the rate and throughput by at least four times. Main application scenarios thereof include video transmission, AR, VR, etc.

Aggregation and cooperation of a plurality of frequency segments refer to simultaneously communicating via a plurality of frequency segments or a plurality of bandwidths in the same frequency segment. For example, simultaneously communicating via three frequency segments, 2.4 GHz, 5.8 GHz and 6-7 GHz. Simultaneously communicating via a plurality of frequency segments or a plurality of bandwidths in the same frequency segment can be understood as multi-connection communication, or Multi-Link Aggregation (MLA).

Figure 1A:
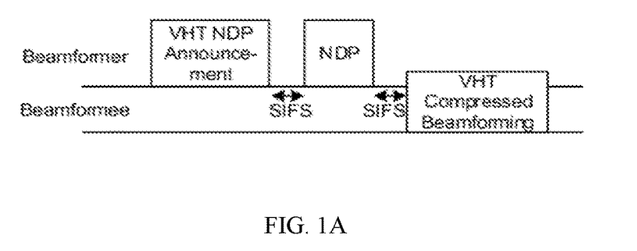
FIG. 1A and FIG. 1B are schematic flowcharts showing a beamforming mechanism according to an example of the present disclosure.
Figure 1B:
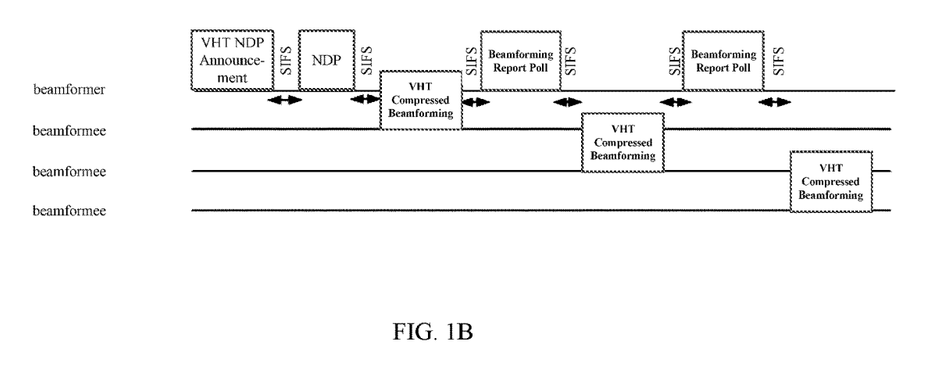

Before interacting data between an AP and an STA, a measurement is performed between the AP and the STA for improving the spectrum utilization efficiency in a more effective way. For improving the transmission rate and quality more efficiently, in the related art, the measurement would be performed using beamforming mechanisms (IEEE802.11ac/ax, respectively), such as FIG. 1A and FIG. 1B. Referring to FIG. 1A and FIG. 1B, prior to starting the measurement, beamformer transmits a probe trigger message frame (as NDP announcement), for example, a Very High Throughput (VHT) NDP announcement or a High Efficiency (HE) NDP announcement. After a certain interval, for example, a Short Inter-Frame Space (SIFS), a measurement message frame is transmitted. The measurement message frame is a NDP frame or a BeamForming Report Poll (BFRP) frame. Beamformee receives the NDP frame and transmits a measurement message feedback frame for feedback. In FIG. 1A and FIG. 1B both, one beamformer transmits a NDP announcement, for example, an AP transmits a NDP announcement frame and a NDP frame, and one or more STAs receive the NDP frame and then transmit a measurement message feedback frame for feedback.

Figure 2:
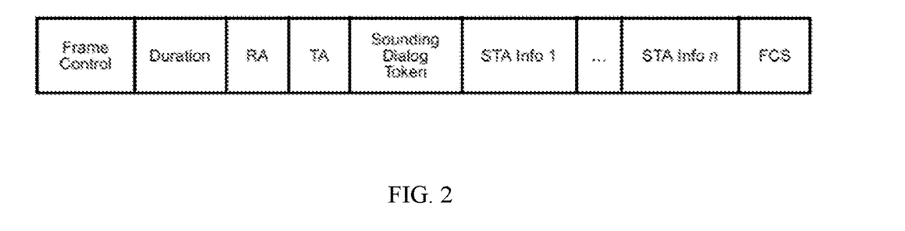
FIG. 2 is a schematic diagram showing a format of a NDP announcement frame according to an example of the present disclosure.

FIG. 2 is a schematic diagram showing a format of a NDP announcement frame.

Referring to FIG. 2, the Null Data Packet (NDP) announcement frame includes Frame control field, Duration, receiver address, transmission address, Sounding Dialog Token, a plurality of station information (STA info1 . . . STA info2) and Frame Check Sequence (FCS).

For improving the spectrum utilization efficiency and the system throughput, IEEE802.11be specifies that communication can be carried out for multi-connection, and that more than one Resource Unit (RU) is to be assigned to an STA. The existing format of NDP announcement frame is no longer suitable for needs of multi-connection communication, so the format of NDP announcement frame is expected to be enhanced to accommodate needs of IEEE802.11be.

Examples of the present disclosure provide a resource allocation method that generates and transmits one or more probe trigger message frames (as NDP announcement frames). A probe trigger message frame includes a plurality of RU start indexes and RU end indexes. For the convenience of description, a start index and an end index for a RU are referred to as a RU index pair, that is, the probe trigger message frame includes a plurality of RU index pairs. Each of the RU index pairs can be understood as corresponding to one RU. Two or more RUs in a plurality of RUs corresponding to the plurality of RU index pairs are to be assigned to one or more STAs with a specified bandwidth to accommodate the needs of multi-connection communication.

Figure 3:
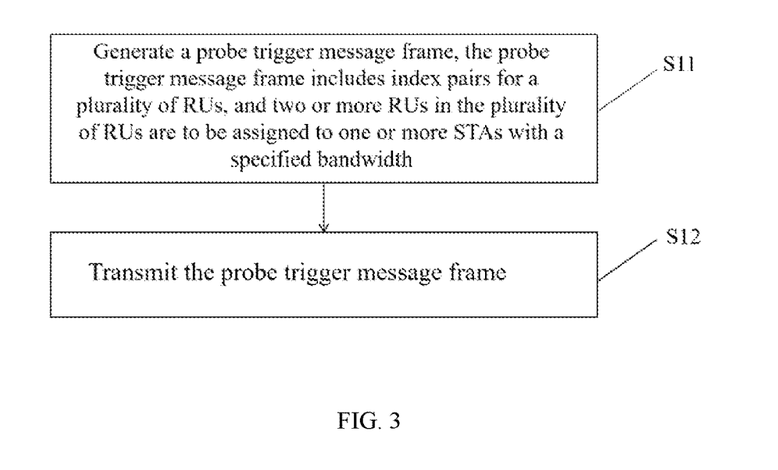
FIG. 3 is a flowchart showing a resource allocation method according to an example of the present disclosure.

FIG. 3 is a flowchart showing a resource allocation method according to an example of the present disclosure. As shown in FIG. 3. the resource allocation method can be applied to a first device which may be an AP or an STA, and can include the following steps.

At step S11, a probe trigger message frame is generated.

At step S12, the probe trigger message frame is transmitted.

In examples of the present disclosure, the generated probe trigger message frame includes a plurality of RU index pairs. Each of the RU index pairs includes a start index and an end index. Two or more RUs in the plurality of RUs for a probe trigger message frame are to be assigned to an STA with a specified bandwidth.

The technical solutions according to the examples of the present disclosure have the following beneficial effects: a probe trigger message frame includes start indexes and end indexes for a plurality of resource units, and two or more resource units in the plurality of resource units are to be assigned to a station with a specified bandwidth, i.e., a plurality of resource units are to be assigned to each station, which enabling resource allocation for multi-connection by transmitting a probe trigger message frame.

Figure 4:
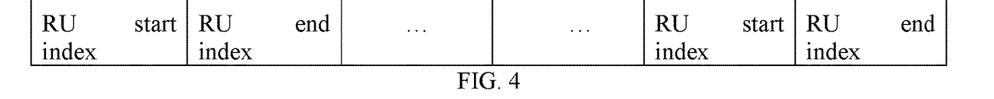
FIG. 4 is a schematic diagram showing a format of a probe trigger message frame including a plurality of RU index pairs according to an example of the present disclosure.

FIG. 4 is a schematic diagram showing a format of a probe trigger message frame including a plurality of RU index pairs according to an example of the present disclosure. The format of probe trigger message frame shown in FIG. 4 indicates an enhancement to a format of an existing NDP announcement frame, by enhancing the STA info subfield of the format of IEEE 802.11ax in FIG. 2 to change the status quo where the format of 802.11ax only supports a single RU. As shown in FIG. 4, the format of probe trigger message frame includes a plurality of RU index pairs, that is, includes RU start indexes and RU end indexes for a plurality of RUs.

The number of RU index pairs is determined based on the number of RUs to be assigned.

In one example, in a case that the RUs to be assigned are discontiguous RUs, the number of RU index pairs indicates the number of the discontiguous RUs. In other words, the number of times RU start indexes and RU end indexes occur in the present disclosure is related to the number of discontiguous RUs to be assigned to an STA. For example, in a case that two discontiguous 26-tone RUs are to be assigned to an STA, and then the number of times RU start indexes and RU end indexes occur is two.

In one example, in a case that the RUs to be assigned are contiguous RUs, the number of RU index pairs is determined based on formats of the RUs. For example, in a case that formats of the contiguous RUs are the same, index pairs for the contiguous RUs are combined into one RU index pair. In a case that the formats of the contiguous RUs are different, the number of index pairs for the contiguous RUs indicates the number of the contiguous RUs. For example, the number of times RU start indexes and RU end indexes occur in the present disclosure is related to the number of contiguous RUs to be assigned to an STA. Assuming that two contiguous 26-tone RUs are to be assigned, the two contiguous 26-tone RUs can be combined into one 52-tone RU, that is, only one RU start index and one RU end index occur. In the related art, RU combinations based on 802.11ax include: 26-tone, 52-tone, 106-tone, 242-tone, 484-tone and 996-tone. To be compatible with the existing RU combinations to be assigned, in a case that RUs to be assigned are two contiguous RUs such as 26-tone and 52-tone, the RU start index and RU end index occur twice.

In examples of the present disclosure, the first device transmits one or more probe trigger message frames for multi-connection simultaneously, because IEEE 802.11be supports multi-connection (a plurality of frequency segments or a plurality of bandwidths in one frequency segment). In one example, two or more RUs in the plurality of RUs are to be assigned to one or more STAs with a specified bandwidth for different connections, which enables transmitting the one or more probe trigger message frames simultaneously for multi-connection.

In examples of the present disclosure, for accommodating to the data exchange between a plurality of APs and a plurality of STAs at the same moment, a plurality of RUs for a probe trigger message frame are to be assigned to a plurality of STAs, and two or more RUs are to be assigned to each STA. In another example, a plurality of RUs for a probe trigger message frame are to be assigned to an STA(s) with a specified bandwidth by one or more APs. In other words, in examples of the present disclosure, one AP can correspond to one or more STAs and a plurality of RUs are to be assigned to each STA. In examples of the present disclosure, a plurality of APs can correspond to one or more STAs and a plurality of RUs are to be assigned to each STA.

In an example of the present disclosure, the probe trigger message frame further includes an STA identifier, such as an Association IDentifier (AID) or a group number, etc. The STA identifier corresponds to the plurality of RUs to be assigned to the STAs with the specified bandwidth. In one example, the STA identifier corresponding to the plurality of RUs to be assigned to the STAs has a correspondence with one or more APs which are to assign the plurality of RUs with the specified bandwidth as well.

In examples of the present disclosure, APs and STAs may have a correspondence as follows: 1 to 1, that is, an AP corresponds to a single STA and an STA identifier corresponds to a plurality of RUs; 1 to many, that is, an AP corresponds to a plurality of STAs and an STA identifier (such as AID) corresponds to a plurality of RUs; many to many, a plurality of APs correspond to a plurality of STAs and an STA identifier (such as AID or a group number) corresponds to a plurality of RUs.

In examples of the present disclosure, for transmitting one or more probe trigger message frames, the probe trigger message frames can be transmitted for a plurality of different connections. In one example, in examples of the present disclosure, the probe trigger message frame(s) further includes an identification bit for indicating that the probe trigger message frame(s) is transmitted for different connections, which can also be understood as transmitting a NDP announcement frame(s) for a plurality of connections at the same time.

Figure 5:
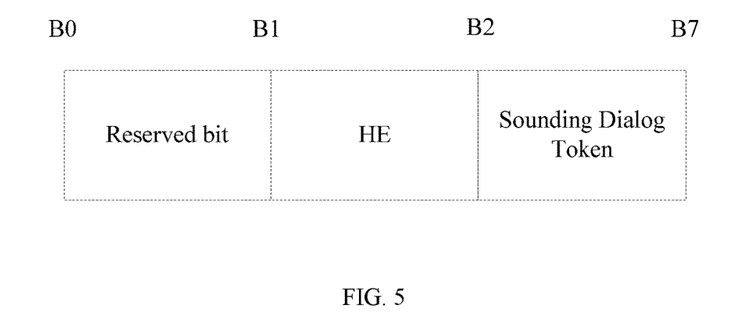
FIG. 5 is a schematic diagram showing a format of an identification bit in a probe trigger message frame according to an example of the present disclosure.

FIG. 5 is a schematic diagram showing a format of an identification bit in a probe trigger message frame according to an example of the present disclosure. In FIG. 5, the Reserved bit is set as the identification bit to indicate that the probe trigger message frame is a probe trigger message frame for multi-connection which is to be transmitted for different connections. The probe trigger message frame shown in FIG. 5 also includes HE field and Sounding Dialog Token field.

In the present disclosure, before the first device transmits one or more probe trigger message frames supporting multi-connection communication, the first device can transmit a capability indication message. The capability indication message is to indicate that communication over multi-connection is supportive, so that a subsequent device receiving the probe trigger message frame may clearly know that the first device is for multi-connection communication.

In a case that the first device is an AP, the capability indication information may be transmitted based on a beacon frame, an association response frame, a probe response frame or an authentication response frame. In a case that the first device is an STA, the capability indication information may be transmitted based on an association request frame, a probe request frame or an authentication request frame.

In examples of the present disclosure, in response to the first device transmitting the probe trigger message frame(s), a second device that receives the probe trigger message frame can transmit a measurement message frame (as NDP frame) without a data portion.

Figure 6:
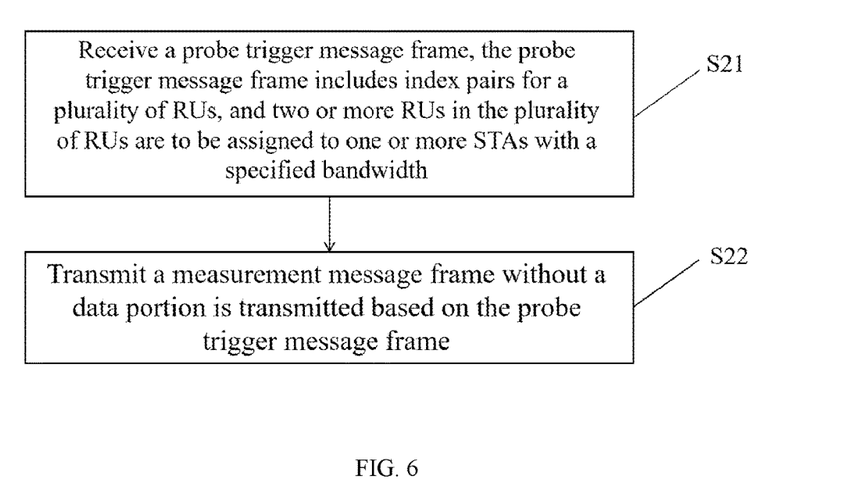
FIG. 6 is a flowchart showing a resource allocation method according to an example of the present disclosure.

FIG. 6 is a flowchart showing a resource allocation method according to an example of the present disclosure. Referring to FIG. 6, the resource allocation method can be applied to a second device, which may be an STA or an AP. The resource allocation method includes the following steps.

At step S21, a probe trigger message frame is received.

The probe trigger message frame includes index pairs for a plurality of RUs. An index pair of a RU includes a start index and an end index. Two or more RUs in the plurality of RUs are to be assigned to an STA with a specified bandwidth, where the specified bandwidth may be 20 MHz/40 MHz/80 MHz/160 MHz/160 MHz+80 MHz/160 MHz+60 MHz/320 MHz.

At step S22, a measurement message frame without a data portion is transmitted based on the probe trigger message frame.

In one example, the two or more RUs in the plurality of RUs are to be assigned to the STAs with the specified bandwidth for different connections.

In another example, a number of the STAs is one or more.

In yet another example, the RUs are to be assigned, by one or more Access Points (APs), to the STAs with the specified bandwidth.

In yet another example, the probe trigger message frame further includes an STA identifier which corresponds to a plurality of RUs to be assigned to the STAs with the specified bandwidth.

In yet another example, the STA identifier has a correspondence with one or more APs which are to assign the plurality of RUs with the specified bandwidth.

In yet another example, the probe trigger message frame further includes an identification bit for indicating that the probe trigger message frame is transmitted for different connections.

In yet another example, a number of the index pairs for the plurality of RUs is determined based on a number of the one or more RUs to be assigned.

In yet another example, in a case that the one or more RUs to be assigned are discontiguous RUs, the number of the index pairs for the plurality of RUs indicates a number of the discontiguous RUs.

In yet another example, in a case that the one or more RUs to be assigned are contiguous RUs, the number of the index pairs for the plurality of RUs is determined based on formats of the RUs.

In yet another example, in a case that the formats of the contiguous RUs are same, the index pairs for the contiguous RUs are combined into a RU index pair; and in a case that the formats of the contiguous RUs are different, the number of the index pairs for the contiguous RUs indicates a number of the contiguous RUs.

In yet another example, in examples of the present disclosure, the second device receives, prior to receiving the probe trigger message frame, a capability indication message, where the capability indication message is to indicate that communication over multi-connection is supportive. In a case that the second device is an AP, the capability indication message is received based on a beacon frame, an association response frame, a probe response frame or an authentication response frame. In a case that the second device is an STA, the capability indication message is received based on an association request frame, a probe request frame or an authentication request frame.

It could be understood that, in examples of the present disclosure, the probe trigger message frame received by the second device is similar to the probe trigger message frame(s) transmitted by the first device. Therefore, for the not exhaustive description of the probe trigger message frame received by the second device, reference can be made to the relevant description in the above examples.

It could be further understood that the resource allocation method provided in examples of the present disclosure may also be applied to an interaction process between the first device and the second device. For the process of implementing the resource allocation method for the interaction process between the first device and the second device, reference can be made to the resource allocation method applied to the first device, and the resource allocation method applied to the second device as involved in the above examples, which will not be described in detail here.

Based on the same concept, examples of the present disclosure also provide a resource allocation apparatus.

It shall be understood that the resource allocation apparatus provided by examples of the present disclosure contains hardware structures and/or software modules that perform the respective functions to achieve the functions described above. In combination with units and algorithmic steps of each example disclosed in examples of the present disclosure, the examples of the present disclosure are capable of being implemented in the form of hardware or a combination of hardware and computer software. Whether a particular function is performed as hardware or computer software driven hardware depends on the particular application and design constraints of the technical solution. A person skilled in the art may use a different approach for each particular application to implement the described functionality, but such implementation should not be considered beyond the scope of the technical solutions in examples of the present disclosure.

Figure 7:
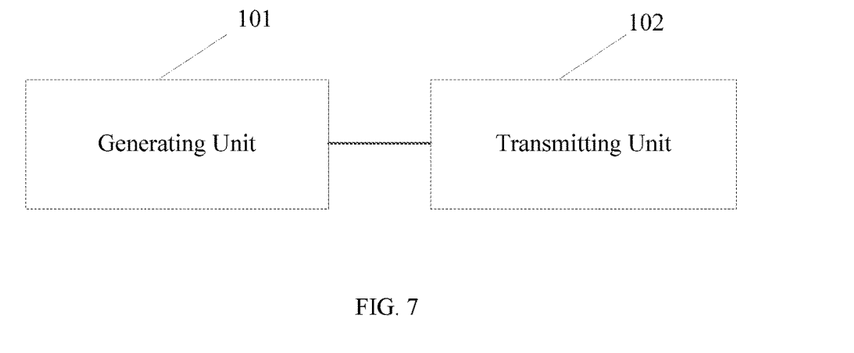
FIG. 7 is a block diagram showing a resource allocation apparatus according to an example of the present disclosure.

FIG. 7 is a block diagram showing a resource allocation apparatus according to an example of the present disclosure. Referring to FIG. 7, the resource allocation apparatus 100 is applicable to a first device. The first device may be an AP or an STA. The resource allocation apparatus 100 includes a generating unit 101 and a transmitting unit 102.

The generating unit 101 is configured to generate a probe trigger message frame, where the probe trigger message frame includes index pairs for a plurality of Resource Units (RUs), each of the index pairs includes a start index and an end index, and two or more RUs in the plurality of RUs are to be assigned to one or more stations (STAs) with a specified bandwidth. The transmitting unit is configured to transmit the probe trigger message frame.

In one example, the two or more RUs in the plurality of RUs are to be assigned to the STAs with the specified bandwidth for different connections.

In another example, a number of the STAs is one or more.

In yet another example, the RUs are to be assigned, by one or more Access Points (APs), to the STAs with the specified bandwidth.

In yet another example, the probe trigger message frame further includes an STA identifier which corresponds to a plurality of RUs to be assigned to the STAs with the specified bandwidth. The STA identifier may be an Association IDentifier (AID).

In yet another example, the STA identifier has a correspondence with one or more APs which are to assign the plurality of RUs with the specified bandwidth.

In yet another example, the probe trigger message frame further includes an identification bit for indicating that the probe trigger message frame is transmitted for different connections. The different connections may be 2.4 GHz, 5 GHz or 6 GHz, or different operating bandwidths with 2.4 GHz, for example 20 MHz and the like.

In yet another example, a number of the index pairs for the plurality of RUs is determined based on a number of RUs to be assigned.

In yet another example, in a case that the RUs to be assigned are discontiguous RUs, the number of the index pairs for the plurality of RUs indicates a number of the discontiguous RUs.

In yet another example, in a case that the RUs to be assigned are contiguous RUs, the number of the index pairs for the plurality of RUs is determined based on formats of the RUs.

In yet another example, in a case that the formats of the contiguous RUs are same, the index pairs for the contiguous RUs are combined into a RU index pair; and in a case that the formats of the contiguous RUs are different, the number of the index pairs for the contiguous RUs indicates a number of the contiguous RUs.

In yet another example, the transmitting unit 102 is further configured to:

transmit, prior to transmitting the probe trigger message frame, a capability indication message, where the capability indication message is to indicate that communication over multi-connection is supportive.

In yet another example, transmitting the capability indication message includes:

in a case that the first device is an AP, transmitting the capability indication message based on a beacon frame, an association response frame, a probe response frame or an authentication response frame; and in a case that the first device is an STA, transmitting the capability indication message based on an association request frame, a probe request frame or an authentication request frame.

Figure 8:
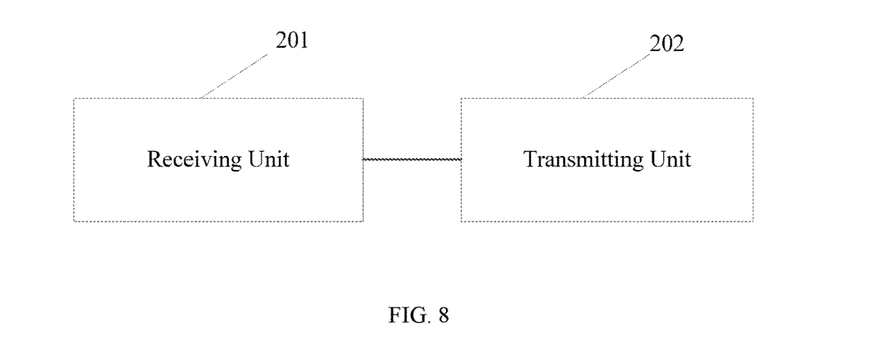
FIG. 8 is a block diagram showing a resource allocation apparatus according to an example of the present disclosure.

FIG. 8 is a block diagram showing a resource allocation apparatus according to an example of the present disclosure. Referring to FIG. 8, the resource allocation apparatus 200 is applicable to a second device. The second device may be an AP or an STA. The resource allocation apparatus 200 includes a receiving unit 201 and a transmitting unit 202.

The receiving unit 201 is configured to receive a probe trigger message frame, where the probe trigger message frame includes index pairs for a plurality of Resource Units (RUs), each of the index pairs includes a start index and an end index, and two or more RUs in the plurality of RUs are to be assigned to one or more stations (STAs) with a specified bandwidth; and the transmitting unit 202 is configured to transmit a measurement message frame without a data portion based on the probe trigger message frame.

In one example, the two or more RUs in the plurality of RUs are to be assigned to the STAs with the specified bandwidth for different connections.

In another example, a number of the STAs is one or more.

In yet another example, the RUs are to be assigned, by one or more Access Points (APs), to the STAs with the specified bandwidth.

In yet another example, the probe trigger message frame further includes an STA identifier which corresponds to a plurality of RUs to be assigned to the STAs with the specified bandwidth.

In yet another example, the STA identifier has a correspondence with one or more APs which are to assign the plurality of RUs with the specified bandwidth.

In yet another example, the probe trigger message frame further includes an identification bit for indicating that the probe trigger message frame is transmitted for different connections.

In yet another example, a number of the index pairs for the plurality of RUs is determined based on a number of RUs to be assigned.

In yet another example, in a case that the RUs to be assigned are discontiguous RUs, the number of the index pairs for the plurality of RUs indicates a number of the discontiguous RUs.

In yet another example, in a case that the RUs to be assigned are contiguous RUs, the number of the index pairs for the plurality of RUs is determined based on formats of the RUs.

In yet another example, in a case that the formats of the contiguous RUs are same, the index pairs for the contiguous RUs are combined into a RU index pair; and in a case that the formats of the contiguous RUs are different, the number of the index pairs for the contiguous RUs indicates a number of the contiguous RUs.

In yet another example, the receiving unit 202 is further configured to receive, prior to receiving the probe trigger message frame, a capability indication message, where the capability indication message is to indicate that communication over multi-connection is supportive.

In yet another example, in a case that the second device is an AP, receiving the capability indication message based on a beacon frame, an association response frame, a probe response frame or an authentication response frame; and in a case that the second device is an STA, receiving the capability indication message based on an association request frame, a probe request frame or an authentication request frame.

With regard to the device in the above examples, the specific manner in which the respective units perform the operations has been described in detail in the examples of the related methods, and will not be explained in detail herein.

Figure 9:
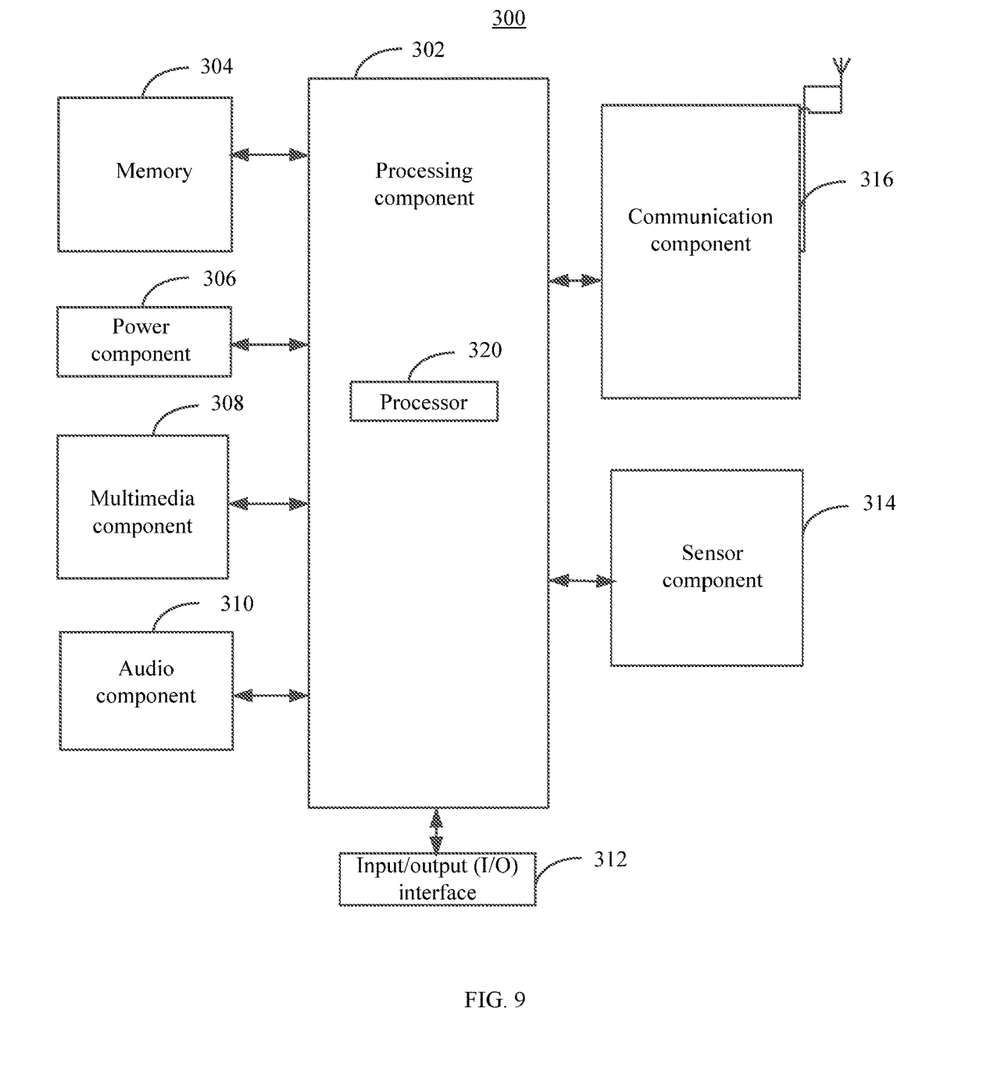
FIG. 9 is a block diagram showing a device according to an example of the present disclosure.

FIG. 9 is a schematic block diagram illustrating a device 300 for resource allocation according to some examples of the present disclosure. For example, device 300 can be a mobile phone, a computer, a digital broadcast terminal, a message transmitting and receiving device, a gaming console, a tablet device, a medical device, a fitness device, a personal digital assistant, and the like.

As shown in FIG. 9, the device 300 may include one or more of the following components: a processing component 302, a memory 304, a power supply component 306, a multimedia component 308, an audio component 310, an input/output (I/O) interface 312, a sensor component 314, and a communication component 316.

The processing component 302 generally controls overall operations of the device 300, such as operations associated with display, phone calls, data communications, camera operations, and recording operations. Processing component 302 can include one or more processors 320 to execute instructions to perform all or part of the steps described above. In addition, the processing component 302 may include one or more modules which facilitate the interaction between the processing component 302 and other components. For example, processing component 302 can include a multimedia module to facilitate interaction between multimedia component 308 and processing component 302.

Memory 304 is configured to store various types of data to support operation at device 300. Examples of such data include instructions for any application or method operated on the device 300, contact data, phonebook data, messages, pictures, videos, and so on. The memory 304 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

Power component 306 provides power to various components of device 300. Power component 306 can include a power management system, one or more power sources, and other components associated with generating, managing, and distributing power for device 300.

The multimedia component 308 includes a screen between the device 300 and the user that provides an output interface. In some examples, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensor may sense not only the boundary of the touch or sliding action, but also the duration and pressure associated with the touch or slide operation. In some examples, the multimedia component 308 may include a front camera and/or a rear camera. In response to the device 300 being in an operation mode, such as a shooting mode or a video mode, the front camera and/or the rear camera can receive external multimedia data. Each front and rear camera can be a fixed optical lens system or have focal length and optical zoom capabilities.

The audio component 310 may be configured to output and/or input an audio signal. For example, the audio component 310 may include a microphone (MIC) configured to receive an external audio signal in response to the device 300 being in an operating mode, such as a call mode, a recording mode, and a voice recognition mode. The received audio signal may be further stored in the memory 304 or sent via the communication component 316. In some examples, the audio component 310 further includes a speaker to output an audio signal.

The I/O interface 312 provides an interface between the processing component 302 and peripheral interface modules. The above peripheral interface modules may be a keyboard, a click wheel, buttons, and so on. These buttons may include, but are not limited to, a home button, a volume button, a start button, and a lock button.

The sensor component 314 may include one or more sensors to provide status assessments of various aspects for the device 300. For example, sensor component 314 can detect an open/closed state of device 300, a relative positioning of components, such as the display and keypad of device 300, and sensor component 314 can also detect a change in position of device 300 or a component of device 300, the presence or absence of user contact with device 300, orientation or acceleration/deceleration of device 300, and a temperature change of device 300. The sensor component 314 may include a proximity sensor configured to detect the presence of a nearby object without any physical contact. The sensor component 314 may further include an optical sensor, such as a CMOS or CCD image sensor which is used in imaging applications. In some examples, the sensor component 314 may further include an acceleration sensor, a gyroscope sensor, a magnetic sensor, a pressure sensor, or a temperature sensor.

The communication component 316 may be configured to facilitate wired or wireless communication between the device 300 and other devices. The device 300 can access a wireless network based on a communication standard, such as WiFi, 2G, 3G, 4G or 5G or a combination thereof. In an exemplary example, communication component 316 receives broadcast signals or broadcast associated information from an external broadcast management system via a broadcast channel. In an exemplary example, the communication component 316 also includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, and other technologies.

In an exemplary example, device 300 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic elements for performing the method described in any of the above examples.

In an exemplary example, there is also provided a non-transitory computer readable storage medium including instructions, such as a memory 304 including instructions executable by processor 320 of device 300 to perform the above method. For example, the non-transitory computer readable storage medium may be a ROM, a random access memory (RAM), a CD-ROM, a magnetic tape, a floppy disk, and an optical data storage device.

Figure 10:
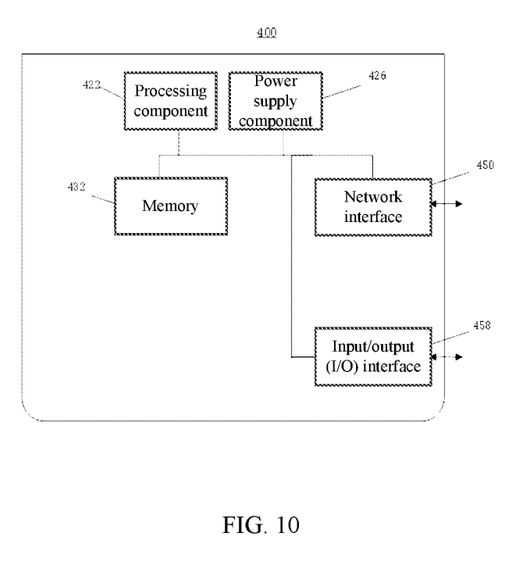
FIG. 10 is a block diagram showing a device according to an example of the present disclosure.

FIG. 10 is a block diagram showing a device according to an example of the present disclosure. For example, the device 400 may be an STA or an AP. Referring to FIG. 10, the device 400 includes a processing component 422 and further includes one or more processors and memory resources represented by a memory 432 and used to store instructions executable by the processing component 422, e.g. application program. The application program stored in the memory 432 may include one or more modules, each of which corresponds to one group of instructions. Further, the processing component 422 is configured to execute instructions to implement the above methods.

The device 400 may further include one power supply component 426 configured to perform power management of the device 400, one wireless or wired network interface 450 configured to connect the device 400 to a network, and one input/output (I/O) interface 458. The device 400 may be operated based on an operating system stored in the memory 432, for example, Windows Server™, Mac OS X™, Unix™, Linux™, FreeBSD™ or the like.

It shall be further understood that, the "plurality" in the present disclosure refers to two or more, and other quantifiers are similar. The "and/or" describes an association relationship of associated objects, indicating that there can be three relationships, for example, A and/or B can mean: A alone, A and B at the same time, and B alone. The character "/" generally indicates that the associated objects before and after are in a relationship of "or". The singular forms "a", "said" and "the" are also intended to include plural forms, unless the context clearly indicates otherwise.

It shall be further understood that, although the terms "first" "second" and the like may be used herein to describe various information, the information should not be limited by these terms. These terms are only used to distinguish one category of information from another, and do not indicate a particular order or level of importance. In fact, the expressions "first" and "second" can be used interchangeably. For example, without departing from the scope of the present disclosure, first information may be referred as second information; and similarly, second information may also be referred as first information.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

It shall be further understood that, in examples of the present disclosure, although operations are depicted in the accompanying drawings in a particular order, this should not be interpreted as requiring that the operations be performed in the particular order shown or in serial order, or that all of the operations shown be performed to obtain the desired results. Multitasking and parallel processing may be advantageous in particular environments.

Other implementations of the present disclosure will be readily apparent to those skilled in the art after implementing the disclosure by referring to the specification. The present application is intended to cover any variations, uses, or adaptations of the present disclosure, which are in accordance with the general principles of the present disclosure and include common general knowledge or conventional technical means in the art that are not disclosed in the present disclosure. The specification and examples therein are only illustrative, and the scope and spirit of the disclosure are to be indicated by appended claims.

It is to be understood that this disclosure is not limited to the above described structures shown in the drawings, and various changes and modifications can be made to the disclosure without departing from the scope thereof. The scope of the disclosure is to be limited only by the appended claims.

The invention claimed is:

1. A resource allocation method, comprising:
generating, by a first device, a probe trigger message frame, wherein the probe trigger message frame comprises index pairs for a plurality of Resource Units (RUs), each of the index pairs comprises a start index and an end index, and the plurality of RUs are to be assigned, by one or more Access Points (APs), to one or more stations (STAs) with a specified bandwidth; wherein the plurality of RUs are different, and are to be assigned to the STAs with the specified bandwidth for different connections; wherein a number of the index pairs for the plurality of RUs is determined based on a number of RUs to be assigned; wherein a start index and an end index for a RU are referred to as a RU index pair; and
transmitting, by the first device, the probe trigger message frame.

2. The resource allocation method according to claim 1, wherein
the probe trigger message frame further comprises an STA identifier which corresponds to the plurality of RUs to be assigned to the STAs with the specified bandwidth; and the STA identifier has a correspondence with the one or more APs which are to assign the plurality of RUs with the specified bandwidth.

3. The resource allocation method according to claim 1, wherein the probe trigger message frame further comprises an identification bit for indicating that the probe trigger message frame is transmitted for different connections.

4. The resource allocation method according to claim 1, wherein
in response to determining that the RUs to be assigned are discontiguous RUs, the number of the index pairs for the plurality of RUs indicates a number of the discontiguous RUs; or
in response to determining that the RUs to be assigned are contiguous RUs, the number of the index pairs for the plurality of RUs is determined based on formats of the RUs.

5. The resource allocation method according to claim 4, wherein
in response to determining that the formats of the contiguous RUs are same, the index pairs for the contiguous RUs are combined into a RU index pair; and
in response to determining that the formats of the contiguous RUs are different, the number of the index pairs for the contiguous RUs is a number of the contiguous RUs.

6. The resource allocation method according to claim 1, further comprising:
transmitting, prior to transmitting the probe trigger message frame, a capability indication message, wherein the capability indication message is to indicate that communication over multi-connection is supportive, wherein in response to determining that the first device is an AP, the capability indication message is transmitted based on a beacon frame, an association response frame, a probe response frame or an authentication response frame; and in response to determining that the first device is an STA, the capability indication message is transmitted based on an association request frame, a probe request frame or an authentication request frame.

7. A resource allocation method, comprising:
receiving, by a second device, a probe trigger message frame, wherein the probe trigger message frame comprises index pairs for a plurality of Resource Units (RUs), each of the index pairs comprises a start index and an end index, and the plurality of RUs are to be assigned, by one or more Access Points (APs), to one or more stations (STAs) with a specified bandwidth; wherein the plurality of RUs are different, and are to be assigned to the STAs with the specified bandwidth for different connections; wherein a number of the index pairs for the plurality of RUs is determined based on a number of RUs to be assigned; wherein a start index and an end index for a RU are referred to as a RU index pair; and
transmitting, by the second device based on the probe trigger message frame, a measurement message frame without a data portion.

8. The resource allocation method according to claim 7, wherein
the probe trigger message frame further comprises an STA identifier which corresponds to the plurality of RUs to be assigned to the STAs with the specified bandwidth; and
the STA identifier has a correspondence with the one or more APs which are to assign the plurality of RUs with the specified bandwidth.

9. The resource allocation method according to claim 7, wherein the probe trigger message frame further comprises an identification bit for indicating that the probe trigger message frame is transmitted for different connections.

10. The resource allocation method according to claim 7, wherein
in response to determining that the RUs to be assigned are discontiguous RUs, the number of the index pairs for the plurality of RUs indicates a number of the discontiguous RUs; or
in response to determining that the RUs to be assigned are contiguous RUs, the number of the index pairs for the plurality of RUs is determined based on formats of the RUs.

11. The resource allocation method according to claim 10, wherein
in response to determining that the formats of the contiguous RUs are same, the index pairs for the contiguous RUs are combined into a RU index pair; and in response to determining that the formats of the contiguous RUs are different, the number of the index pairs for the contiguous RUs is a number of the contiguous RUs.

12. The resource allocation method according to claim 7, further comprising:
receiving, prior to receiving the probe trigger message frame, a capability indication message, wherein the capability indication message is to indicate that communication over multi-connection is supportive, in response to determining that the second device is an AP, the capability indication message is received based on a beacon frame, an association response frame, a probe response frame or an authentication response frame; and in response to determining that the second device is an STA, the capability indication message is received based on an association request frame, a probe request frame or an authentication request frame.

13. A resource allocation apparatus, comprising:
a processor,
a memory for storing executable instructions by the processor;
wherein the processor is configured to perform the resource allocation method of claim 1.

14. A resource allocation apparatus, comprising:
a processor,
a memory for storing executable instructions by the processor;
wherein the processor is configured to perform the resource allocation method of claim 7.

15. A non-transitory computer-readable storage medium, wherein the storage medium stores computer program instructions, in response to instructions in the storage medium being executed by a processor, the processor is caused to perform the resource allocation method of claim 1.

16. A non-transitory computer-readable storage medium, wherein the storage medium stores computer program instructions, in response to instructions in the storage medium being executed by a processor, the processor is caused to perform the resource allocation method of claim 7.

17. The resource allocation method according to claim 1, wherein the specified bandwidth comprises 320 Mhz.

18. The resource allocation method according to claim 7, wherein the specified bandwidth comprises 320 Mhz.

* * * * *